United States Patent
Bianco et al.

(10) Patent No.: US 8,441,244 B2
(45) Date of Patent: May 14, 2013

(54) CONTROL SYSTEM FOR SWITCHING DC-DC CONVERTERS

(75) Inventors: Alberto Bianco, Gressan (IT); Andrea Cappelletti, Capiago Intimiano (IT); Stefano Saggini, San Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 824 days.

(21) Appl. No.: 12/560,415

(22) Filed: Sep. 15, 2009

(65) Prior Publication Data

US 2010/0072968 A1 Mar. 25, 2010

(30) Foreign Application Priority Data

Sep. 15, 2008 (IT) .............. MI2008A1640

(51) Int. Cl.
*G05F 1/40* (2006.01)
*G05F 1/56* (2006.01)

(52) U.S. Cl.
USPC ................ 323/284; 323/271; 323/285

(58) Field of Classification Search ............ 323/222, 323/225, 268, 271, 282–285, 288
See application file for complete search history.

(56) References Cited

U.S. PATENT DOCUMENTS

| | | | |
|---|---|---|---|
| 6,181,120 B1 | 1/2001 | Hawkes et al. | |
| 6,518,738 B1 | 2/2003 | Wang | |
| 6,873,140 B2 * | 3/2005 | Saggini et al. | 323/283 |
| 7,652,945 B2 * | 1/2010 | Chu et al. | 365/226 |
| 7,705,579 B1 * | 4/2010 | Hariman et al. | 323/284 |
| 8,067,929 B2 * | 11/2011 | Huang et al. | 323/284 |
| 2004/0012376 A1 | 1/2004 | Taghizadeh-Kaschani | |
| 2004/0135567 A1 | 7/2004 | Fukui | |
| 2004/0145927 A1 | 7/2004 | Haase | |

OTHER PUBLICATIONS

Search Report for Italian Patent Application No. MI2008A1640; Aug. 20, 2009.

* cited by examiner

*Primary Examiner* — Matthew Nguyen
(74) *Attorney, Agent, or Firm* — Graybeal Jackson LLP (57) ABSTRACT

A control system for a switching DC-DC converter is proposed. The converter includes an input terminal for receiving an input voltage from a source, a control terminal adapted to receive a switching control signal, and an output terminal for providing to a load an output voltage generated from the input voltage according to the control signal. The control system includes detecting means for detecting a reaching condition of a predetermined value by a current provided to the load by the converter and control means for controlling the control signal according to the output voltage. The control system further includes disabling means for disabling the supply of the control signal to the control terminal according to the detection of the reaching condition. The disabling means includes selection means for controlling the disabling according to a time relationship between the detection of the reaching condition and the control signal.

11 Claims, 5 Drawing Sheets

CONTROL SYSTEM FOR SWITCHING DC-DC CONVERTERS

PRIORITY CLAIM

The instant application claims priority from Italian Patent Application No. MI2008A1640, entitled CONTROL SYSTEM FOR SWITCHING DC-DC CONVERTERS, filed Sep. 15, 2008, which application is incorporated herein by reference in its entirety.

TECHNICAL FIELD

The solution according to an embodiment of the present disclosure relates generally to the electronics field, and more particularly to switching direct current-direct current (DC-DC) converters, and in greater detail concerns a switching control system for converters of such type.

BACKGROUND

A DC-DC converter is an electronic circuit adapted to convert a direct current source from a voltage value to another one. An important application field of DC-DC converters is digital electronic devices (for example, computers) that are supplied by a main power system. Particularly, a generic digital electronic device supplied by the main power system is provided with a supply circuit adapted to provide a DC voltage by rectifying an alternating voltage. A digital electronic device, however, is generally formed by a plurality of sub-circuits, with each of them needing a supply voltage value that is different (higher or lower) than the voltage provided by the supply circuit.

One of the most relevant among the known types of DC-DC converters is switching DC-DC converters. Considering a DC-DC converter of the "step-down" type, wherein the input voltage is converted into an output voltage having a lower value, an example of the operation thereof will be now described. During a first phase—denoted as a "main phase"—the switching DC-DC converter electrically couples a source of the input voltage (to be converted) to a terminal of a reactive element, typically an inductor. As a consequence, in this phase the reactive element stores magnetic energy from an input current from the input voltage source. In this phase, the output load requiring the (converted) output voltage receives energy from the input voltage source. In a second phase—denoted "secondary phase"—the reactive element is disconnected from the input voltage source, and the output load receives the magnetic energy that has been stored in the reactive element during the main phase. Acting on the ratio between the main phase and secondary phase durations—denoted "duty cycle"—, it is possible to regulate the transfer of energy from the voltage source to the output load in a controlled way, and thus bring the voltage provided to the output load to the requested value.

Practically, a switching DC-DC converter of such type may be implemented by connecting a first terminal of the inductor to two switch circuits (for example, power MOS transistors), and particularly a first switch—denoted main switch—adapted to electrically couple the first terminal of the inductor to the source of the input voltage during the main phase, and a second switch—denoted secondary switch—adapted to electrically couple the first terminal of the inductor to a terminal providing a reference voltage (for example, ground) during the secondary phase, and connecting the second terminal of the inductor to the output load (for example, through a voltage stabilizer). The two switch circuits are driven by respective driving signals, for example by means of complementary versions of a same square signal having a constant frequency (this particular case is referred to as constant frequency driving). By varying the duty cycle of such driving signal in such a way to increase/decrease the duration of the main phase with respect to the secondary phase one, it is possible to increase/decrease the value of the output voltage obtainable by means of the conversion. Since the current request from the output load typically varies during operation, for keeping the output voltage value as stable as possible, the switching DC-DC converters are typically provided with a feedback control circuit, adapted to sense any difference of the output voltage from a desired value and vary the duty cycle of the driving signal for compensating and counterbalancing such differences.

Generally, the efficiency of the switching DC-DC converters is afflicted by two main types of losses, i.e., the so-called conduction losses and the so-called switching losses.

The conduction losses are due to the power dissipation that generates when the current flows across the parasitic resistances of the devices (mainly, the resistances of the switches and of the inductor). Such losses are proportional both to the amount of such resistance values and to the square of the current crossing the devices.

The switching losses are instead due to the consumption of the electric power required for the switching of the switches. Such losses are proportional to the switching frequency of the switches, and thus to the frequency of the driving signal, and in some cases may be particularly high, for example in case it is necessary to provide the charge required for turning on a switch implemented with a power MOS transistor that exhibits a high drain-to-source voltage—in jargon, "hard switching" condition.

Switching DC-DC converters are characterized by a great efficiency for loads that require currents of high values, while such efficiency falls when the currents required by the load become very low, near to zero (light load condition).

Indeed, the current of the inductor of a switching DC-DC converter exhibits an oscillatory trend, and particularly an increasing trend during the main phase and a decreasing one during the secondary phase, both having a slope which depends on the inductance value of the inductor and on the difference between the converter input voltage and the converter output voltage. The mean value of the inductor current of the DC-DC converter has instead a value that corresponds to the value of the current required by the load. As a consequence, considering that the amplitude of such oscillations is independent from the value of the current required by the load, if such current is close to zero, the power transfer balance becomes unfavorable, because the inductor current becomes negative for certain time intervals (during both the main phase, and the secondary phase).

As a consequence, in a light load condition, wherein the power transfer balance is already highly unfavorable, the power dissipated because of the switching losses may even exceed the power actually transferred from the source to the load and improved control systems for such operating conditions are needed.

SUMMARY

Particularly, embodiments of the present invention are directed to control systems for a switching DC-DC converters. In one embodiment, the converter includes an input terminal for receiving an input voltage from a source, a control terminal adapted to receive a switching control signal, and an output terminal for providing to a load an output voltage generated from the input voltage according to the control signal. The control system includes detecting means for detecting a reaching condition of a predetermined value by a current provided to the load by the converter and control means for controlling the control signal according to the output voltage. The control system further includes disabling means for disabling the supply of the control signal to the control terminal according to the detection of the reaching condition. The disabling means includes selection means for controlling the disabling according to a time relationship between the detection of the reaching condition and the control signal.

Further embodiments of the present invention are directed to corresponding methods for controlling switching DC-DC converters.

BRIEF DESCRIPTION OF THE DRAWINGS

The solution according to one or more embodiments of the invention, as well as further features and advantages thereof will be best understood by reference to the following detailed description, given purely by way of a non-restrictive indication, to be read in conjunction with the accompanying drawings. In this respect, it is expressly intended that the figures are not necessary drawn to scale and that, unless otherwise indicated, they are merely intended to conceptually illustrate the structures and procedures described herein. Particularly.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

For the purpose of reducing the negative effects of conduction losses, one solution provides for interrupting the transfer of current during certain portions of the secondary phase, for example opening the secondary switch when the current of the converter's inductor become close to zero, and maintaining such condition until the subsequent period of the driving signal. In this way, a diode behavior is simulated, avoiding that the value of the current of the converter's inductor become negative. This particular solution is known as diode-emulation switching control system.

However, this solution it is not capable of resolving in a satisfactory way the problems due to the presence of the switching losses, because employing such solution does not allow modifying the switching frequency of the switches, which continue to waste electrical power, regardless of whether current flows through them or not.

A solution for reducing the negative effect of the switching losses consists in using a switching control system denoted as "pulse skipping". For example, a pulse skipping switching control circuit may provide, if the current of the converter's inductor reaches a value close to zero, that the DC-DC converter enters into a pulse skipping operation modality, during which both the main switch and the secondary one remain open for a duration that is equal to a multiple of the driving signal period, until the duration of the main phase set by the feedback control circuit in response to the variation of the output voltage of the converter does not exceed a minimum value.

In this way, instead of transferring power from the source to the load every period of the driving signal by means of small transfers, using the pulse skipping control system the power transfer is concentrated only during each predetermined number of periods. With a such solution, the efficiency of the conversion is increased, since the effect of the switching losses is reduced. Indeed, while in the normal case the switches are switched every period (with a consequent waste of electric power) even if the power transferred from the source to the load is very low, using the pulse skipping switching control system it is necessary to provide power to the switches only when the transfer from the source to the load requires a sufficient amount of power.

An implementation of a pulse skipping switching control system monitors the current of the inductor of the converter during the secondary phase. If the current of the inductor reaches the zero, the converter enters in the pulse skipping modality, until the feedback control circuit of the DC-DC converter sets the main phase duration to a value higher than a minimum value, determined by a component that is outside the control device (for example, a resistor). Such minimum value is determined during the design phase, taking into account that too low a value would make the converter operate in the normal operation way, i.e., with the power that is transferred in small amounts from the source to the load practically every period of the driving signal, while a too high value would negatively affect the correct operation of the switching DC-DC converter, causing very high oscillations of the current of the inductor.

Practically, the minimum value of the main phase above which the converter exits from the pulse skipping modality is set equal to a value corresponding to a so-called continuous current mode, corresponding to a condition wherein the current of the inductor of the converter is always higher than zero.

Having a minimum value set in the design phase (and, thus, which cannot be varied during the device operation) is a great drawback, since the real switching DC-DC converter would behave in a way that is different than the ideal behavior provided during the design phase. This problem is exacerbated in case the converter was designed for high voltage variations, for example for converting a 12 Volts voltage into a 15.5 Volts voltage. Indeed, in this case the duration of the main phases will be really short, and therefore even a little setting error would be sufficient to seriously reduce the conversion efficiency.

In another solution, a pulse skipping switching control system applicable to switching DC-DC converters of the Buck type is utilized. Such a control system is capable of determining in an automatic way the minimum value of the main phases by monitoring the input voltage values and the output voltage values of the converter. Practically, the control system monitors with continuity the values of the two voltages, and determines a minimum value of the main phase corresponding to a continuous current mode, i.e., given by the product between the period of the driving signal (equals to the sum of the durations of the main phase and of the secondary phase) and the ratio between the output voltage and the input voltage.

Although such solution is decidedly more advantageous with respect to the previous one, since the minimum value calculated in this way adjusts to the real operative behavior of the converter, such a solution does not lack flaws. Firstly, the formula or determining the minimum value is applicable to the Buck topologies only. Moreover, the control system requires a high amount of hardware resources since the input voltage of the converter is monitored. Furthermore, in order to efficiently determine the minimum value, such control system requires the generation of a compensating ramp that is as accurate as possible, particularly in the cases in which the minimum value to be determined is really low.

Figure 1:
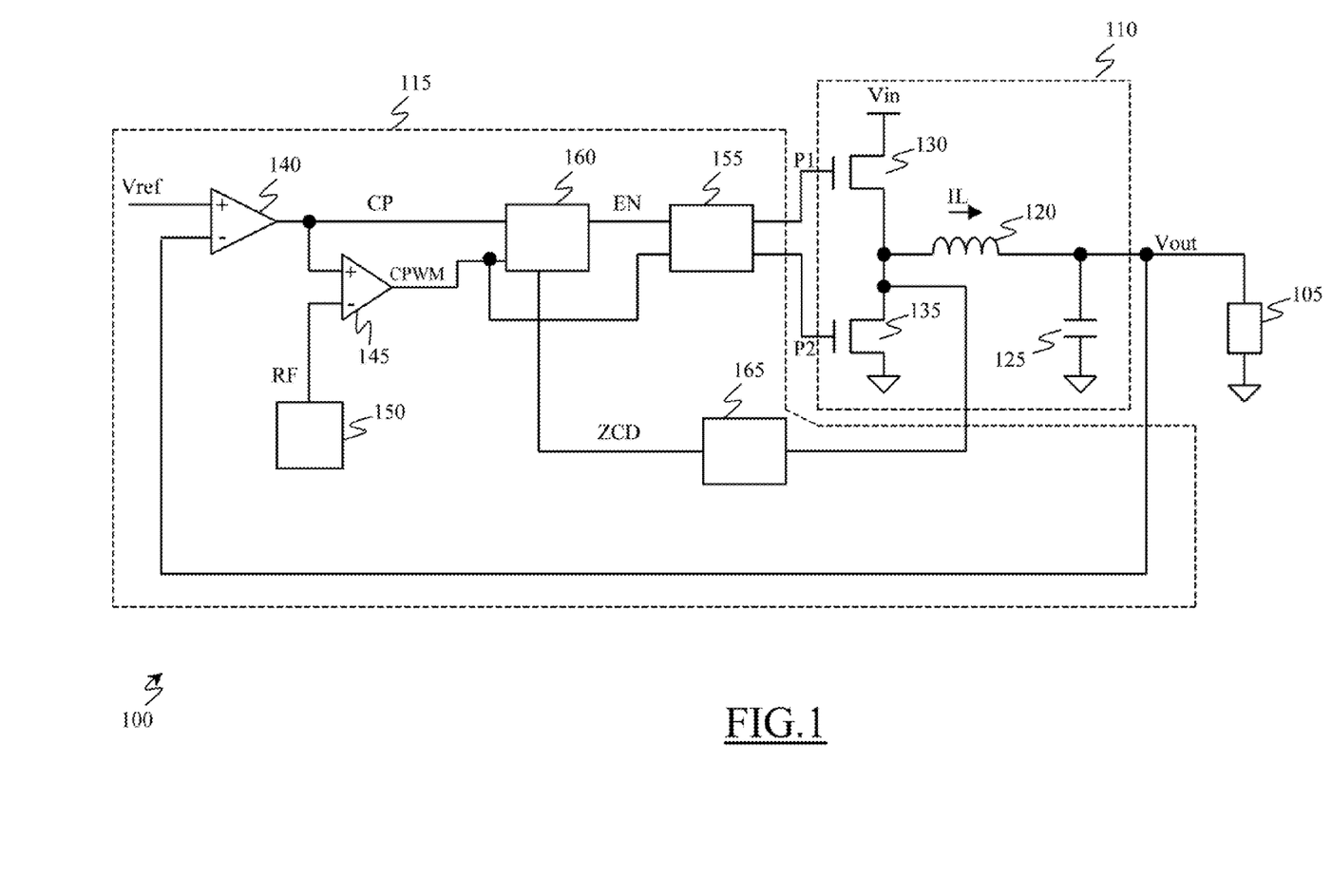
FIG. 1 illustrates a voltage conversion unit according to an embodiment of the present invention.

With reference to the drawings, FIG. 1 illustrates an embodiment of the present invention.

Particularly, with the numeric reference 100 it is indicated a voltage conversion unit, adapted to convert a (DC) input voltage Vin into a (DC) output voltage Vout having a different value to be provided to a load 105, schematized in the figure by means of a bipolar element. For example, the voltage conversion unit 100 may be included in a digital electronic device, such as a computer supplied by an alternating voltage of a main power system. In this case, the input voltage Vin may be sourced by a computer supply circuit and may have a value of 12 Volts, while the load 105 may be whichever circuit included in the computer that requires a supply voltage Vout having a different value, such as 1.5 Volts.

The voltage conversion unit 100 includes two main sections, and particularly a switching DC-DC converter 110 adapted to convert the input voltage Vin into the output voltage Vout, and a switching control system 115 adapted to drive the DC-DC converter 110.

In the considered example, the value of the input voltage Vin is higher than the one of the output voltage Vout, and thus the DC-DC converter 110 is a step down converter. However, the concepts of the present invention are applicable to other types of switching DC-DC converters, such as the converters wherein the input voltage value is lower than the output voltage value.

The DC-DC converter 110 illustrated in FIG. 1 is a converter having a Buck topology, including an inductor 120, a capacitor 125, a main switch 130 and a secondary switch 135. Each switch 130, 135 is implemented with a transistor, for example, an n-channel power MOS transistor having a first and a second transfer terminals and a control terminal. Particularly, the main switch 130 has the first transfer terminal connected to the supply circuit (not shown in the figure) for receiving the input voltage Vin, the second transfer terminal connected to the first transfer terminal of the secondary switch 135, and the control terminal connected to the switching control system for receiving a driving signal P1, for example a digital Pulse Width Modulation (PWM) signal. The secondary switch 135 has the second transfer terminal connected to a reference terminal for receiving a reference voltage (ground voltage), and the control terminal connected to the switching control system 115 for receiving a driving signal P2, for example a PWM signal that is a complementary version of the driving signal P1. The inductor 120 has a first terminal connected to the second terminal of the switch 130 and to the first terminal of the switch 135, and a second terminal connected to the load 105 for providing the output voltage Vout. The capacitor 125 has a first terminal connected to the second terminal of the inductor 120, and a second terminal connected to the reference terminal for receiving the ground voltage.

Figure 2:
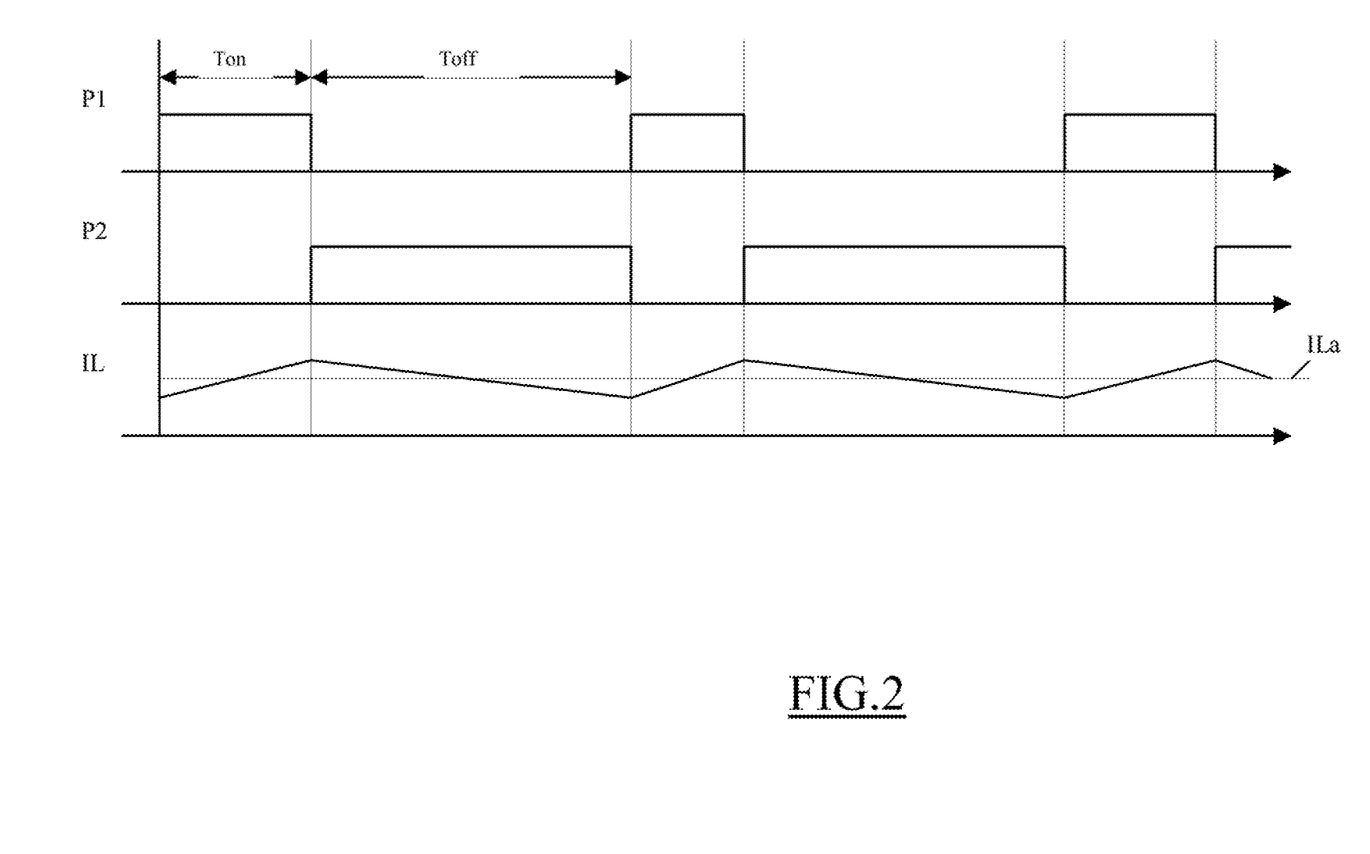
FIG. 2 is a sample timing diagram of the evolution of some signals of the conversion unit of FIG. 1 during a continuous current mode.

Before describing in a detailed way the circuit structure of the switching control system 115, the operation of the DC-DC converter 110 in the continuous current mode (i.e., in case the current flowing across the inductor is always higher than zero) will be now described. For this purpose, reference will be made to FIG. 1 together with FIG. 2, illustrating an exemplary timing diagram showing the temporal trend of some electric signals of the DC-DC converter 110.

As already anticipated in the introduction, the operation of a switching DC-DC converter of the Buck type involves the execution of two phases, i.e., a main phase and a secondary phase, which are repeated in succession in a periodical way.

During the main phase, having a duration Ton, the inductor 120 is connected to the source of the input voltage Vin—in this case, the supply circuit—by asserting the driving signal P1 (for example to the high logic value) and thus closing the main switch 130. During the main phase, the driving signal P2 is deasserted (for example, to the low logic value), and the secondary switch 135 is thus open. In this condition, the inductor 120 is crossed by a current ILIL that linearly increases (in the direction shown in the figure, i.e., from the first to the second terminal of the inductor) with a slope that is proportional to the potential difference developed across the terminals of the inductor 120—equal to the input voltage Vin minus the output voltage Vout—, and that charges the capacitor 125. During the main phase a transfer of power from the supply circuit to the DC-DC converter 110 occurs, because the magnetic energy stored in the inductor 120 increases.

During the secondary phase, having a duration Toff, the driving signal P1 is deasserted, and thus the main switch 130 is opened; in the same way, the driving signal P2 is asserted, causing the closure of the secondary switch 135. In this condition, the inductor 120 is crossed by a current ILIL that linearly decreases with a slope proportional to the voltage difference developed across the terminals of the inductor 120, in this case equal to the output voltage Vout. During the secondary phase, the capacitor 125 is discharged, the inductor 120 is insulated from the source of the input voltage Vin, and a transfer of power from the inductor 120 to the load 105 occurs (the magnetic energy stored in the inductor decreases).

The output current that is actually sourced to the load 105 has thus a value equal to the mean value ILa of the current of the inductor IL.

As it is well known to skilled technicians, in this way of operation the ratio between the output voltage Vout and the value of the input voltage Vin is equal to the duty cycle D (expressed through a numeric value included in the interval [0,1]) of the driving signal P1. In other words, the value of the output voltage Vout may be increased by increasing the duty cycle D, i.e., by increasing the duration Ton of the main phase, and decreased by decreasing the duty cycle D, i.e., decreasing the duration Ton of the main phase.

By observing FIG. 2 it is possible to note that if the current sunk by the load 105—equal to the mean value ILa of the current ILIL of the inductor—diminishes, the waveform of the current ILIL of the inductor 120 is shifted toward the bottom. If the current sunk by the load 105 has a very low value, the current ILIL of the inductor 120 may assume negative values for some time periods. In this case, the DC-DC converter 100 exits from the continuous current mode, the balance of the power transferred to the load 105 becomes less advantageous, and the efficiency of the conversion diminishes. As already discussed, a solution for increasing the conversion efficiency in such cases provides for adopting a pulse skipping modality for the control of the switches 130, 135.

Returning back to FIG. 1, the switching control system 115 has the purpose of generating the driving signal P1 and P2, and particularly of generating the duty cycle D, in such a way to guarantee that the value of the output voltage Vout is kept at the desired level, even in presence of variations in the current sunk by the load 105.

The switching control system 115 performs a feedback control on the output voltage Vout, comparing it with a reference voltage Vref, and generating the driving signals P1 and P2 with a duty cycle D which depends on the result of the comparison.

Particularly, the switching control system 115 takes the output voltage Vout from the DC-DC converter 110, and provides it to an inverting terminal of an amplifier 140. The non-inverting terminal of the amplifier 140 receives instead the reference voltage Vref.

The amplifier 140 generates a comparison signal CP whose amplitude depends on the difference between the reference voltage Vref and the output voltage Vout, and provides it to the non-inverting terminal of a comparator 145. Particularly, the higher the difference between the output voltage value Vout and the reference voltage value Vref, the higher the amplitude of the comparison signal CP.

The inverting terminal of the comparator 145 is connected to an oscillator circuit 150 for receiving a reference signal RF, and particularly a saw-tooth voltage signal having a period equals to Ton+Toff, which increases its value, starting from the ground voltage, with a constant slope for the duration of the whole period, and that returns then to the ground voltage value in a rapidly way at the end of each period.

The comparator 145 outputs a PWM control signal CPWM, whose duty cycle DC is determined by the amplitude of the comparison signal CP. Indeed, the higher the amplitude of the comparison signal CP, the higher the time employed by the reference signal RF (which increases with a constant slope for the duration of the whole period) for reaching the value of the comparison signal CP during the period. As a consequence, the more the output voltage Vout is higher than the reference voltage Vref, the lower the duty cycle DC of the control signal CPWM, and vice versa.

The control signal CPWM is employed for driving the switches 130, 135 through a driving circuit 155 receiving the control signal CPWM and outputting the driving signal P1 and P2. Particularly, the amplitude of the driving signals P1 and P2 is determined by the driving circuit 155 based on the switches 130, 135 type, while the duty cycle D is set to be equal to the duty cycle DC of the control signal CPWM.

In this way, the main phase duration Ton id proportional to the duty cycle DC of the control signal CPWM. Particularly, if the output voltage Vout was higher than the reference voltage Vref, the amplitude of the comparison signal CP would decrease, and consequently the duty cycle DC of the control signal CPWM would decrease as well. Therefore, in this case the output voltage Vout would decrease because of the reduction of the main phase duration Ton. In an equivalent way, if the output voltage Vout was lower than the reference voltage, the amplitude of the comparison signal CP would increase, and consequently the duty cycle DC of the control signal CPWM would increase as well. Therefore, in this case the output voltage Vout would be forced to increase, because of the increase of the main phase duration Ton.

The switching control system 115 according to an embodiment of the present invention includes a pulse skipping management circuit (briefly, pulse skipping circuit), identified in figure with the reference 160.

The pulse skipping circuit 160 receives the comparison signal CP provided by the amplifier 140, the control signal CPWM provided by the comparator 145, and a sensing signal ZCD whose logic value depends on the value assumed by the inductor current IL. Particularly, the sensing signal ZCD is generated by a circuit block 165 coupled to the DC-DC converter 110 for receiving an indication of the value assumed by the inductor current IL, and determining when such value reaches a predefined threshold, for example equals to a zero current value. In the moment in which the value of the inductor current IL becomes lower than zero, the circuit block 165 asserts the sensing signal ZCD (for example, to the logic high value), which is deasserted (for example, to the logic low value) as soon as the value of the inductor current IL becomes positive. Without having to enter in technical details which are beyond the scope of the present application, the circuit block 165 may be implemented by means of a MOS current detector.

Based on the behavior of the comparison signal CP, of the control signal CPWM and of the sensing signal ZCD, the pulse skipping circuit 160 generates a (digital) enabling signal EN for enabling the driving circuit 155. Particularly, when the enabling signal EN is asserted (for example, to the high logic value) by the pulse skipping circuit 160, the driving circuit 155 is enabled, and the driving signals P1, P2 are normally generated based on the control signal CPWM as previously described When instead the enabling signal EN is deasserted (for example, to the low logic value) by the pulse skipping circuit 160, the voltage conversion unit 100 enters in the pulse skipping modality, with the driving circuit 155 that is disabled, and the driving signals P1, P2 that are set to the low logic value—implying the switches 130, 135 to be opened (i.e., turned off) at the same time.

As will be more clear in the following description, at the beginning of each period of the control signal CPWM, the enabling signal EN is deasserted—in such a way that the voltage conversion unit 100 enters in the pulse skipping modality—if the main phase duration Ton determined by the comparison signal CP is lower than a minimum value Tmin determined by the pulse skipping circuit 160 based on the trend of the inductor current IL during the previous period.

Figure 3:
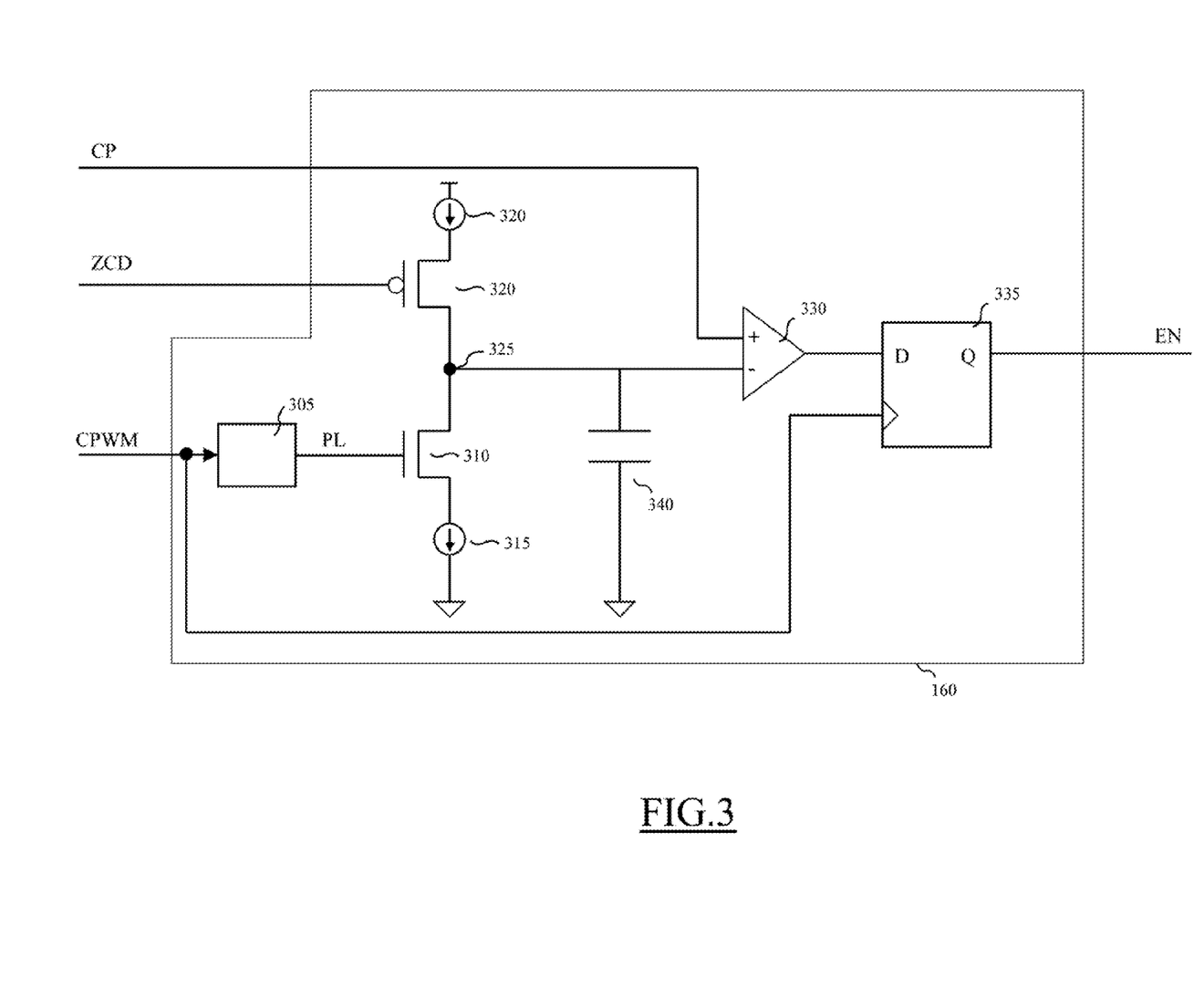
FIG. 3 illustrates in detail the circuit structure of a pulse skipping circuit included in the voltage conversion unit of FIG. 1 according to an embodiment of the present invention.

FIG. 3 illustrates in detail the circuit structure of the pulse skipping circuit 160 according to an embodiment of the present invention.

The pulse skipping circuit 160 comprises a monostable multivibrator (MSMV) 305 adapted to receive the control signal CPWM and output a corresponding signal PL. The signal PL is a train of pulses having a predefined duration having a period equal to Ton+Toff.

The signal PL is provided to a control terminal of an n-channel MOS transistor 310, having a first conduction terminal coupled with a first terminal of a constant current generator 315 and a second conduction terminal coupled with a first conduction terminal of a p-channel MOS transistor 320 (circuit node 325). The constant current generator 315 includes a second terminal connected to a reference terminal which provides the ground voltage.

The transistor 320 further comprises a control terminal coupled with the circuit block 165 for receiving the sensing signal ZCD and a second conduction terminal coupled with a first terminal of a constant current generator 320. The constant current generator has a second terminal connected to a supply terminal that provides a supply voltage Vcc—for example, provided by the supply circuit.

The pulse skipping circuit 160 further includes a comparator 330, having an inverting terminal connected to the circuit node 325, a non-inverting terminal connected to the output of the amplifier 140 for receiving the comparison signal CP and an output terminal coupled with an input terminal of a D-type flip-flop 335. The flip-flop 335 has a clock terminal receiving the control signal CPWM and an output terminal that generates the enabling signal EN.

The circuit node 325 is further coupled with a first terminal of a capacitor 340, which has a second terminal connected to a reference terminal for receiving the ground voltage.

Figure 4:
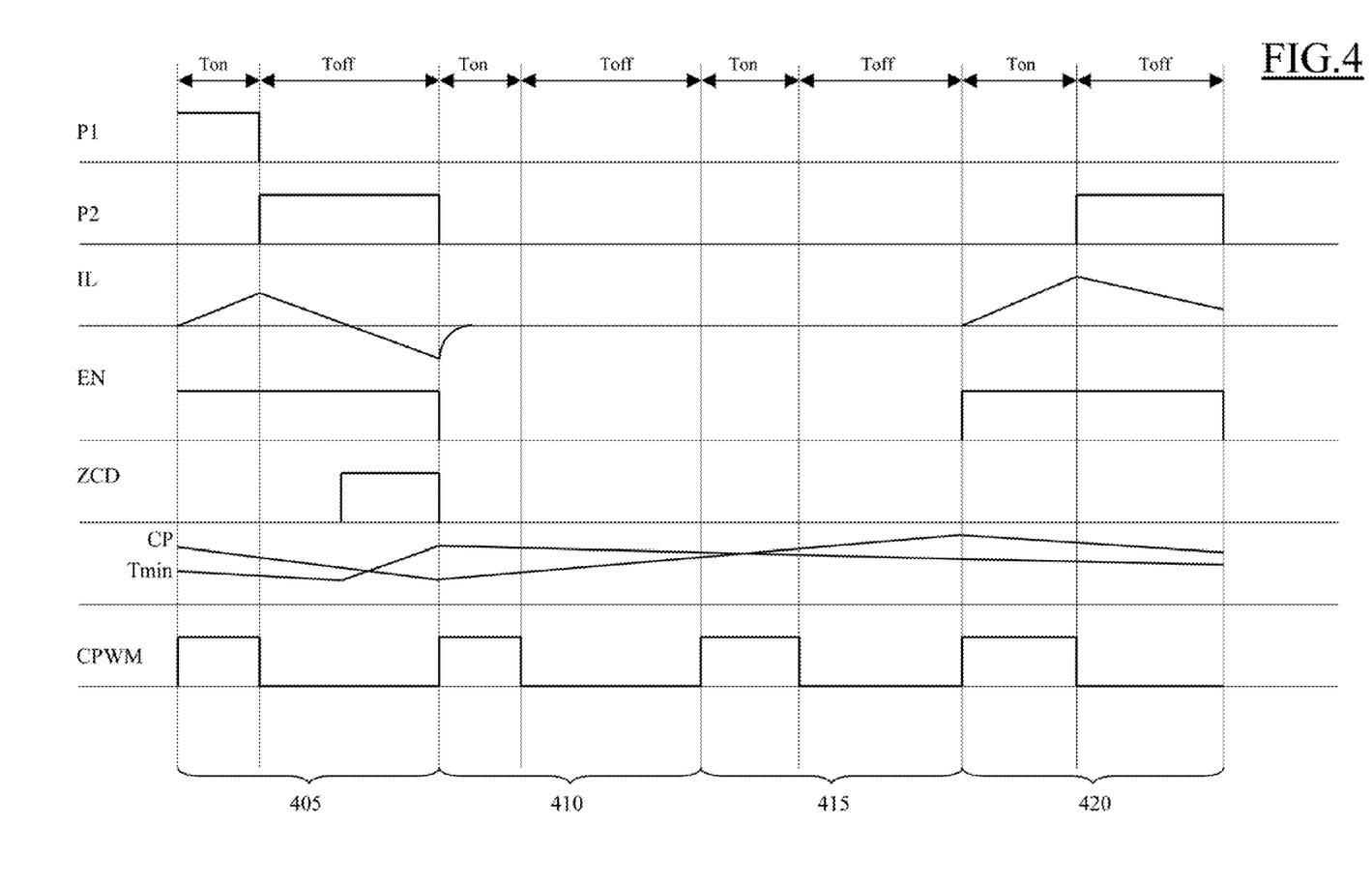
FIG. 4 is a sample timing diagram of the evolution of some signals of the conversion unit of FIG. 1 and the pulse skipping circuit of FIG. 3 during a pulse skipping operation modality.

In order to describe the operation of the voltage conversion unit 100 (and particularly of the pulse skipping circuit 160) according to an embodiment of the present invention, reference will be made to FIG. 1, FIG. 3 and FIG. 4, illustrating an example of how some signals of the voltage conversion unit 100 and of the pulse skipping circuit 160 evolve over time during the operation in the pulse skipping modality.

Particularly, in the considered example, it is supposed that during a first period 405 of the control signal CPWM, the DC-DC converter 110 is active, i.e., the voltage conversion unit 100 is not operating in the pulse skipping modality. In this condition, the enable signal EN is asserted. As a consequence:
  during the main phase of the period 405, the driving signal P1 is asserted for a duration Ton, while the driving signal P2 is deasserted, and
  during the secondary phase, the driving signal P2 is asserted for a duration Toff, while the driving signal P1 is deasserted.

During the period 405, the duty cycle D of the driving signal P1 corresponds (is equal) to the duty cycle DC of the control signal CPWM.

As already described in detail, during the main phase the inductor current ILIL increases, while during the secondary phase, such current ILIL decreases. In the example at issue, the current requested by the load 105—equal to the average value ILa of the inductor current ILIL—has a very low value, and thus the inductor current IL decreases until crossing zero during the secondary phase of the period 405, and becoming negative.

Such event is detected by the circuit block 165 that asserts the sensing signal ZCD to the high logic value when the inductor current IL reaches the zero value.

According to an embodiment of the present invention, the minimum value Tmin of the duration Ton of the main phase (determined by the comparison signal CP) under which it is necessary to enter in the pulse skipping operation modality is determined by the pulse skipping circuit 160 by measuring the time occurrence of the zeroing of the inductor current IL.

Particularly, according to an embodiment of the present invention, such minimum value Tmin is represented by the voltage at the circuit node 325. At the end of a generic period of the control signal CPWM:
  If the amplitude of the comparison signal CP—determining the duration Ton of the main phase—is higher than the voltage of the circuit node 325, it means that the duration Ton of the main phase is higher than the minimum value Tmin, and thus it is not necessary to enter in the pulse skipping modality. As a consequence, the enabling signal EN will be asserted to the high logic value at the following period of the control signal CPWM.
  If instead the amplitude of the comparison signal CP results to be lower than the voltage of the circuit node 325, it means that the duration Ton of the main phase is lower than the minimum value Tmin, and thus it is necessary to enter in the pulse skipping modality. As a consequence, the enabling signal EN will be deasserted to the low logic value at the following period of the control signal CPWM.

The voltage of the circuit node 325 that represents the minimum value Tmin is determined by the pulse skipping circuit 160 in the following way.

According to an embodiment of the present invention, the monostable multivibrator 305 generates a pulse having a predefined duration at the beginning of each period of the control signal CPWM, which is provided to the control terminal of the transistor 310. In this way, for the (predefined) duration of such pulse, the transistor 310 turns on, and the circuit node 325 is connected to the constant current generator 315. Every period of the control signal CPWM, and thus every pulse generated by the monostable multivibrator 305, a predefined amount of electric charge stored in the capacitor 340 is subtracted through the current generator 315. A a consequence, the value of the voltage of the circuit node 325 diminishes by a predefined amount every period of the control signal CPWM.

If during a generic period of the control signal CPWM the inductor current ILIL goes to zero, the sensing signal ZCD is asserted to the high logic value at the zeroing of the current ILIL. As a consequence, at the zeroing of the current ILIL the transistor 320 is activated, connecting the constant current generator 320 to the circuit node 325 until the end of the period of the control signal CPWM. During this time interval, the current generator 320 provides electric charge to the capacitor 340, thus increasing the voltage of the circuit node 325.

It has to be pointed out that, according to the previously described embodiment, while the electric charge decreasing of the capacitor 340 (and, thus, the decreasing of the voltage of the circuit node 325) occurs every period of the control signal CPWM, and such decreasing is the same amount, the electric charge of the capacitor 340 is increased only in the periods of the control signal CPWM during which a zeroing of the inductor current IL occurs. Moreover, the electric charge in the capacitor 340 is increased by an amount which depends on the occurrence of the inductor current IL zeroing with respect to the end of the period of the control signal CPWM. Particularly, the earlier the inductor current IL zeroing occurs with respect to the beginning of the control signal CPWM period, the higher the electric charge increasing of the capacitor 340, and, thus, the higher the increasing of the voltage of the circuit node 325.

According to an alternative embodiment of the present invention, the electric charge decreasing of the capacitor 340 (and, thus, the diminishing of the voltage of the circuit node 325) may occur only when the voltage conversion unit 100 does not work in the pulse skipping operation modality. In this way, during the pulse skipping operation modality, the voltage of the circuit node 325, and thus the minimum value Tmin, remains fixed to the value determined in the period of the control signal CPWM which has determined the triggering of the pulse skipping operation modality.

Coming back to the example illustrated in FIG. 4, the voltage of the circuit node 325 during the period 405 starts to increase as soon as the sensing signal ZCD is asserted to the high logic value, i.e., at the zeroing of the inductor current IL.

At the end of the period 405, the amplitude of the comparison signal CP is lower than the voltage at the circuit node 325, which means that the duration Ton of the main phase is lower than the minimum value Tmin. As a consequence, the output of the comparator 330 switches to the low logic value, and, starting from the subsequent period of the control signal CPWM (i.e., the period 410), the enabling signal EN is deasserted to the low logic value. In this way the voltage conversion unit 100 enters in the pulse skipping operation modality.

In such modality both the driving signal P1 and the driving signal P2 are deasserted to the low logic value, and the switches 130, 135 remain opened during the whole period 410. In this condition, the inductor current IL rapidly reaches the zero value, and remains to such value for the whole period 410. Meanwhile, the output voltage Vout tends to decrease, since the electric power exchange with the source of the input voltage Vin is interrupted, and thus the amplitude of the comparison signal CP increase as a consequence.

This situation remains also in the subsequent period 415, since in the considered example at the end of the period 410 the amplitude of the comparison signal CP has not still reached the value of the voltage of the circuit node 325.

It has to be pointed out that during the periods 410 and 415 wherein the voltage conversion unit 100 operates in the pulse skipping operation modality, the amplitude of the comparison signal CP is increased in response to the decreasing of the output voltage Vout. Such increasing of the amplitude of the comparison signal CP provokes a corresponding increasing in the duration Ton of the main phase—corresponding to the duty cycle DC of the control signal CPWM.

At the end of the period 415, the amplitude of the comparison signal CP is higher than the value of the voltage of the circuit node 325, which means that the duration Ton of the main phase is higher than the minimum value Tmin. As a consequence, the output of the comparator 330 switches to the high logic value, and, starting from the subsequent period of the control signal CPWM (i.e., the period 420), the enabling signal EN is asserted again to the high logic value. In this way the voltage conversion unit 100 exits from the pulse skipping operation modality, the inductor current IL is incremented again, since the driving signals P1 and P2 are enabled again.

It has to be pointed out that the duration Ton of the main phase corresponding to the period 420 is higher than that corresponding to the period 405, and that the balance of the power transferred from the source of the input voltage Vin and the load 105 is increased in a positive way. Indeed, in the example illustrated in FIG. 4, there is noted that the proposed switching control system 115 has automatically modified the duration Ton of the main phase in such a way that the inductor current IL is higher than zero for the whole period 420, i.e., that the voltage conversion unit operates in the pulse skipping operation modality.

Thanks to the proposed solution, the minimum value Tmin of the duration Ton of the main phase automatically adapts to the real operative behavior of the voltage conversion unit 100. Moreover, such solution may be adapted to other switching converter topologies, it does not require any particular hardware complication, since the pulse skipping circuit 160 is formed by relatively simple circuit devices, and does not require the monitoring of the input voltage Vin.

The following of the describes some alternative and/or additional embodiments of the proposed switching control system and pulse skipping circuit according to the present invention.

First of all, although the pulse skipping circuit 160 previously described fits with switching control systems 115 of the analog type, the concepts of the present invention may be applied to the case of switching control systems of the digital type, too.

Particularly, a switching control system of the digital type may include a digital to analog converter adapted to convert the output voltage Vout into a digital value and to determine an error value corresponding to the difference between the digital value of the output voltage and a reference value (digital version of the reference voltage Vref). The error value may thus be filtered by a PID type filter for the purpose of generating a digital signal (corresponding to the comparison signal CP of the analog case) to be provided to a digital modulator for the generation of the control signal of the PWM type to be provided to the driving circuit 155 for the generation of the driving signals P1 and P2. The pulse skipping circuit 160 may be replaced by a digital counterpart, for example comprising a digital register that memorizes a standard minimum value Tmin which is decreased every period by a predefined amount. In case the inductor current IL reaches the zero value, the value memorized in the register may be increased by an amount that is proportional to the time between the inductor current IL zeroing occurrence and the end of the period.

The concepts of the present invention may be applied also to the cases in which the current requested by the load is high, such as in the case of a voltage conversion unit having a multi-phase topology.

Briefly, such multi-phase topology provides for a plurality of N switching DC-DC converters, having the outputs connected to each other and to a common output capacitor (i.e., outputs connected in parallel). The common output voltage is fed back to a single amplifier (corresponding to the amplifier 140 of FIG. 1) for being compared with a reference voltage. In turn, the amplifier generates a comparison signal similar to the comparison signal CP, whose amplitude depends on the difference between the reference voltage and the output voltage. Such comparison signal is provided to N comparators (corresponding to the comparator 145 of FIG. 1) for being compared with a respective reference signal. Particularly, each comparator receives a respective reference signal generated by a respective oscillator circuit (corresponding to the oscillator circuit 150). For the purpose of reducing the output voltage oscillations, the reference signals generated by each oscillator are phase shifted relative to each other. Each comparator generates thus a corresponding control signal of the PWM type, used for driving the switches of a respective switching DC-DC converter. As it is well known to skilled technicians, in a multi-phase topology of such type the inductor currents of the N switching DC-DC converters may be equalized providing for a current sharing circuit capable of modifying the duty cycles of the various control signals in response to the occurrence of possible variations in the currents generated in the various switching DC-DC converters.

In a such multi-phase topology it is possible to provide for a pulse skipping operation modality, providing N pulse skipping circuits—equivalent to the previously described pulse skipping circuit 160—, and particularly a pulse skipping circuit for each one of the N switching DC-DC converters.

Each pulse skipping circuit receives the common comparison signal, a control signal generated by a respective comparator and a sensing signal, corresponding to the sensing signal ZCD generated from the inductor current of the respective switching DC-DC converter. Furthermore, each pulse skipping circuit includes a respective capacitor—corresponding to the capacitor 340—whose charge is charged and discharged depending on the behavior of the inductor current of the respective DC-DC converter and whose voltage determines a respective minimum value Tmin.

Each one of the N switching DC-DC converters may be driven by the respective pulse skipping circuit for operating in the pulse skipping modality regardless of the other ones, based on a comparison between the amplitude of the common comparing signal and the voltage value of the capacitor of the respective pulse skipping circuit.

It has to be pointed out that in some applications (for example, the supply of electric power to a last generation processor), the current requested by the load 105 and the reference voltage Vref may vary in a very short time.

In these cases, the feedback ring defined by the switching control circuit 115 of FIG. 1 may be not capable of responding to such variations in a sufficiently fast way, and, in case the current required by the load 105 becomes so small to require the invoking of a pulse skipping operation modality, the pulse skipping circuit of FIG. 3 may not operate in an efficient way.

Particularly, further to a fast increasing of the current required by the load 105 during the pulse skipping operation modality, the switches 130 and 135 are deactivated, and maintained in such condition until the comparison signal CP does not reach a value corresponding to a duration Ton of the main phase higher than the minimum value Tmin, even through such condition may require a non-negligible amount of time.

Moreover, further to a diminishing of the reference voltage Vref occurred during the pulse skipping operation modality, the capacitor 125 would not be capable of discharging, because during the pulse skipping operation modality the current requested by the load 105 is almost zero, and the secondary switch 135 is open.

In these situations, i.e., when a variation of the current requested by the load 105 and/or of the reference voltage Vref occurs, it would be desirable to drive the closing of the main switch 130 or the second switch 135, in such a way to force the voltage conversion unit 100 to exit from a possible pulse skipping operation modality, and directly drive the switches 130, 135 according to the control signal CPWM for a period of time which is sufficiently long to let the value of the current in the voltage conversion unit 100 to stabilize.

As a consequence, according to an embodiment of the present invention, the switching control system 115 of FIG. 1 is modified in such a way to provide for a function for disabling the pulse skipping operation modality during such variations.

As already described, further to a variation in the current requested by the load, the comparison signal CP varies in such a way to counteract such variation, i.e., determining an increase in the duty cycle DC of the control signal CPWM for increasing the current transfer or a decrease of the duty cycle DC of the control signal CPWM for decreasing the current transfer.

When the output voltage Vout requires to be regulated within a settled interval of values (for example, for supplying a microprocessor voltage values comprised within the 0.8 and 2 Volts are required), it is possible to efficiently sense a variation in the current required by the load and/or in the reference voltage Vref by comparing the duty cycle DC determined by the comparison signal CP with an interval DS of duty cycle values (defined by a maximum duty cycle value Dmax and by a minimum duty cycle value Dmin) corresponding to a stationary regulation, i.e., in which the current required by the load and/or the reference voltage Vref is not subjected to rapid variations of high amounts.

If the duty cycle DC determined by the comparison signal CP is higher than the maximum duty cycle value Dmax, or is lower than the minimum duty cycle value Dmin, the pulse skipping operation modality is disabled for a guard period Tguard higher than the typical maximum duration of a variation in the current required by the load and/or in the reference voltage Vref.

According to an embodiment of the present invention, such function for disabling the pulse skipping operation modality during variations in the current required by the load 105 and/or in the reference voltage Vref of such type may be implemented in the analog switching control system 115 of FIG. 1 by means of the addition of a verify circuit comprising a pair of guard comparators, and in particular a first guard comparator adapted to verify whether the amplitude of the comparison signal CP corresponding to a particular duty cycle DC, is higher than a threshold value corresponding to the maximum duty cycle value Dmax or not, and a second guard comparator adapted to verify whether the amplitude of the comparison signal CP is lower than a threshold value corresponding to the minimum duty cycle value Dmin or not.

If one of the two abovementioned conditions is fulfilled, the verify circuit disables the pulse skipping operation modality for a guard period Tguard, for example forcing the enabling signal EN to the high logic value, regardless of what the pulse skipping circuit 160 has determined. In other words, if one of the two abovementioned conditions is verified, the minimum value Tmin is set to a zero value for all the duration of the guard period Tguard.

Such solution may be applied also to the switching control systems of the digital type. Particularly, in a system of this type it would be sufficient to position the guard comparators at the output of the switching DC-DC converter, and directly monitor the output voltage, controlling whether such voltage has surpassed or not a low threshold and a high threshold.

In several applications, the capacitor 125 connected to the output of the switching DC-DC converter 110 is a multilayered ceramic capacitor, since it is characterized by a low equivalent series resistance. A capacitor of such type is formed by a plurality of thin layers, which vibrate if the capacitor is crossed by current pulses. If the capacitor 125 (implemented with a multilayered ceramic capacitor) is crossed by current pulses Il with a frequency comprised within the audible band, the switching DC-DC converter 110 may produce a hum during its operation. Although the frequency of the current pulses Il determined by the control signal CPWM typically does not belong to the audible band, the activation of the pulse skipping circuit 160 may shift such frequency toward the audible band, for example if the load 105 conditions require the skipping of a high number of consecutive periods of the control signal CPWM.

A possible solution eliminates or at least reduces the production of hum during the operation of the switching DC-DC converter 110 according to an embodiment of the present invention.

Briefly, according to such a solution, the duration Ton of the main phase determined by the comparison signal CP is compared again with a minimum value Tmin determined by the pulse skipping circuit 160 at each period of the control signal CPWM, but in this case such minimum value Tmin is decreased by a predetermined amount at each period of the control signal CPWM after the occurrence of a time interval Tultra spent in the pulse skipping operation modality corresponding to the inverse of the cut-off frequency of the audible frequency band. In this way, the switching DC-DC converter 110 is forced to generate at least a current pulse Il regardless of the load 105 requests, avoiding that the situation where the frequency of the current IL pulses is within the audible band.

A possible implementation of such solution adapted to be used in a switching control system of the analog type may provide for the additional removal of a predefined amount of charge from the capacitor 340 every period of the control signal CPWM after the occurrence of a number of consecutive periods of the control signal CPWM spent in the pulse skipping operation modality whose global duration is not lower than the time interval Tultra.

Although the proposed pulse skipping circuit 160 has been described as it is included in a feedback control system in which the feedback quantity is a voltage—particularly, the output voltage Vout of the converter—, the concepts of embodiments of the present invention apply also in the case in which the feedback quantity is a current—particularly, the current IL of the inductor.

Figure 5:
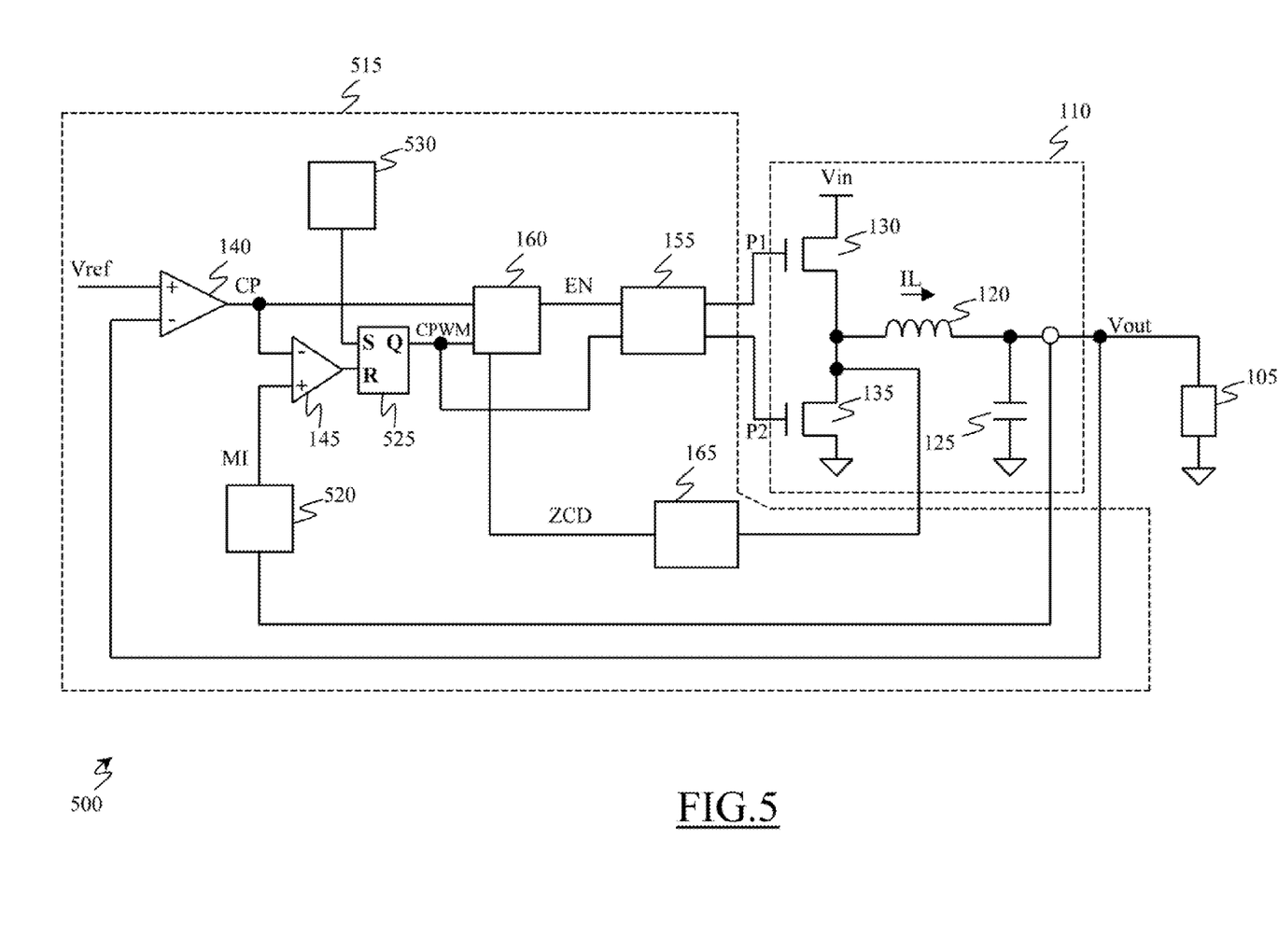
FIG. 5 illustrates a voltage conversion unit according to a further embodiment of the present invention.

FIG. 5 illustrates a voltage conversion unit 500 according to an embodiment of the present invention wherein the feedback quantity is a current. The voltage conversion unit 500 has a structure that is very similar to the voltage conversion unit 100 illustrated in FIG. 1, and thus the elements corresponding to that illustrated in FIG. 1 are identified with the same reference, and their explanation is omitted.

In the voltage conversion unit 500, the switching control system—identified with the reference 515—includes a current detector 520 coupled with the output of the switching DC-DC converter 110 for measuring the current IL of the inductor and providing a measure signal MI to the non-inverting terminal of the comparator 145, which measure signal MI having an amplitude proportional to the amplitude of the measured current IL; the inverting terminal of the comparator 145 results instead to be connected with the output terminal of the amplifier 140 for receiving the comparison signal CP.

The output terminal of the comparator 145 is connected to a reset terminal of a set-reset flip-flop 525. The flip-flop 525 further includes a set terminal coupled with an oscillator 530 which generates a voltage pulse train at a predefined frequency, and an output terminal coupled with the pulse skipping circuit 160 for providing the control signal CPWM.

According to this embodiment of the invention, the control signal CPWM is generated by the flip-flop 525 based on the value of the inductor current IL measured by the current detector 520. At every pulse generated by the oscillator 530, the flip-flop 525 is set, and the control signal CPWM assumes the high logic value, while every time the amplitude of the measure signal MI—corresponding to the value of the current IL—exceeds the one of the comparison signal CP, the flip-flop 525 is reset, and the control signal CPWM assumes the low logic value.

Aside from such differences, the operation of the voltage conversion unit 500 coincides with the one of the voltage conversion unit 100 illustrated in FIG. 1.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a matter of general design choice.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A voltage converter circuit, comprising:
   a control circuit; and
   a switching DC-DC converter, the switching DC-DC converter adapted to receive an input voltage and an input current and configured responsive to a switching control signal from the control circuit to generate an output voltage and an output current from the input voltage and input current, the control circuit configured to detect the value of the output current and further configured in a normal operational mode when the output current is greater than a threshold value to apply the switching control signal to the switching DC-DC converter to control the value of the generated output voltage, and configured in a pulse-skipping mode when the output current is less than or equal to the threshold value to terminate application of the switching control signal to the DC-DC converter as a function of the duration between a first time when the output current is detected as reaching the threshold value and a second time defined by an end of at least a second period of the switching control signal.

2. The voltage converter of claim 1 wherein the threshold value is equal to zero.

3. The voltage converter of claim 1 wherein the DC-DC converter comprises a buck converter.

4. The voltage converter of claim 1 wherein the control circuit generates a first voltage having a value corresponding to the first time, the first voltage being generated by discharging a capacitive node for a predetermined time responsive to the start of each period of the switching control signal and charging the capacitive node when the output current is less than or equal to the threshold value.

5. The voltage converter of claim 1 wherein the control circuit is configured to discharge the capacitive node every period of the switching control signal.

6. The voltage converter of claim 5 wherein the control circuit is further configured to charge the capacitive node for a duration equal to the duration between the first and second times.

7. A voltage converter circuit comprising:
   a control circuit; and
   a switching DC-DC converter, the switching DC-DC converter adapted to receive an input voltage and an input current and configured responsive to a switching control signal from the control circuit to generate an output voltage and an output current from the input voltage and input current, the control circuit configured to detect the value of the output current and further configured in a normal operational mode when the output current is greater than a threshold value to apply the switching control signal to the switching DC-DC converter to control the value of the generated output voltage, and configured in a pulse-skipping mode when the output current is less than or equal to the threshold value to terminate application of the switching control signal to the DC-DC converter as a function of the duration between a first time when the output current is detected as reaching the threshold value and a second time defined by an end of a period of the switching control signal;
   wherein the control circuit comprises:
   an amplifier adapted to receive a reference voltage on a first input and the output voltage on a second input, and to output a comparison signal having a value that indicating the difference between the reference and output voltages;
   an oscillator circuit configured to generate a saw-toothed signal;
   a sensing circuit configured to generate a sensing signal indicating when the output current is equal to or less than the threshold value;

a comparator having a first input coupled to the amplifier to receive the comparison signal and having a second input coupled to the oscillator circuit to receive the sawtoothed signal, and configured responsive to the sawtoothed and comparison signals to output a pulse width control signal;

a pulse-skipping circuit coupled to the amplifier, the comparator and the sensing circuit and configured responsive to the pulse width control signal and the sense signal to compare the comparison signal to a minimum time threshold value and to selectively activate or deactivate an enable signal responsive to this comparison; and a driving circuit coupled to the comparator and to the pulse-skipping circuit, the driving circuit configured to apply the switching control signal to the DC-DC converter when the enable signal is active to terminate application of the switching control signal when the enable signal is inactive.

8. An electronic system, comprising:

a voltage converter circuit including a control circuit and a switching DC-DC converter, the switching DC-DC converter adapted to receive an input voltage and an input current and configured responsive to a switching control signal from the control circuit to generate on an output node an output voltage and an output current from the input voltage and input current, the control circuit configured to detect the value of the output current and further configured in a normal operational mode when the output current is greater than a threshold value to apply the switching control signal to the switching DC-DC converter to control the value of the generated output voltage, and configured in a pulse-skipping mode when the output current is less than or equal to the threshold value to terminate application of the switching control signal to the DC-DC converter as a function of the duration between a first time when the output current is detected as reaching the threshold value and a second time defined by an end of at least a second period of the switching control signal; and electronic circuitry coupled to the output node of the voltage converter circuit.

9. The electronic system of claim 8 wherein the electronic circuitry comprises digital device circuitry.

10. The electronic system of claim 9 wherein the digital device circuitry comprises computer circuitry.

11. The electronic system of claim 8 further comprising a plurality of voltage converter circuits having output nodes coupled in parallel to the electronic circuitry and configured in combination as a multi-phase voltage converter circuit.

* * * * *

UNITED STATES PATENT AND TRADEMARK OFFICE
CERTIFICATE OF CORRECTION

PATENT NO. : 8,441,244 B2
APPLICATION NO. : 12/560415
DATED : May 14, 2013
INVENTOR(S) : Alberto Bianco, Andrea Cappelletti and Stefano Saggini It is certified that error appears in the above-identified patent and that said Letters Patent is hereby corrected as shown below:

On the title page, item (73) Assignees add DORA S.P.A., AOSTA, Italy - as second assignee Signed and Sealed this
Twentieth Day of October, 2015

Michelle K. Lee
*Director of the United States Patent and Trademark Office*